(12) United States Patent
Skynar

(10) Patent No.: US 12,280,825 B1
(45) Date of Patent: Apr. 22, 2025

(54) METHOD AND SYSTEM FOR CONTROLLING A VEHICLE SUSPENSION FOR REDUCED ROLLING RESISTANCE

(71) Applicant: FCA US LLC, Auburn Hills, MI (US)

(72) Inventor: Mark J Skynar, Farmington Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/606,112

(22) Filed: Mar. 15, 2024

(51) Int. Cl.
   *B62D 17/00* (2006.01)
   *B60G 17/015* (2006.01)

(52) U.S. Cl.
   CPC ............ *B62D 17/00* (2013.01); *B60G 17/015* (2013.01)

(58) Field of Classification Search
   CPC ... B60C 11/0304; B60B 15/26; B60B 15/263; B60G 17/015; B62D 17/00
   See application file for complete search history.

(56) References Cited

U.S. PATENT DOCUMENTS

| | | | | |
|---|---|---|---|---|
| 2,894,410 A | * | 7/1959 | Libby | B60K 17/352 74/473.33 |
| 3,014,547 A | * | 12/1961 | Van Der Lely | B60B 35/1054 301/43 |
| 3,495,672 A | * | 2/1970 | Barr | B60B 15/263 301/38.1 |
| 5,225,011 A | | 7/1993 | Takino et al. | |
| 5,464,050 A | | 11/1995 | Bonko | |
| 7,845,666 B2 | * | 12/2010 | Lynch | B62K 5/02 280/282 |
| 7,850,252 B2 | * | 12/2010 | Mills | B60B 15/263 301/41.1 |
| 8,444,227 B2 | * | 5/2013 | Mills | B60B 15/025 301/41.1 |
| 9,022,084 B2 | | 5/2015 | Zhao et al. | |
| 10,351,162 B1 | * | 7/2019 | Katzourakis | B62D 5/001 |
| 11,065,933 B2 | * | 7/2021 | Hille | B60G 21/007 |
| 11,591,011 B1 | * | 2/2023 | Churukian | B62D 6/00 |
| 11,780,283 B2 | * | 10/2023 | Broadbent | B62D 7/146 280/93.512 |
| 2008/0252135 A1 | * | 10/2008 | Mills | B60B 15/025 301/40.1 |
| 2011/0121636 A1 | * | 5/2011 | Mills | B60B 15/025 301/41.1 |
| 2012/0221196 A1 | | 8/2012 | Seymour et al. | |
| 2019/0061430 A1 | * | 2/2019 | Kamigori | B60C 11/0304 |
| 2020/0307344 A1 | * | 10/2020 | Hille | B60G 17/01908 |

(Continued)

FOREIGN PATENT DOCUMENTS

| | | | |
|---|---|---|---|
| CA | 309537 A | 3/1931 | |
| DE | 102006006513 A1 * | 8/2007 | ........... B60G 21/007 |

(Continued)

OTHER PUBLICATIONS

KR_960000248_B1_I machine translation from FIT (Year: 2024).*

*Primary Examiner* — Paul N Dickson
*Assistant Examiner* — Maxwell L Meshaka
(74) *Attorney, Agent, or Firm* — Jeremy J. Klobucar

(57) ABSTRACT

A system and method of operating a vehicle includes determining a condition of the vehicle, changing a camber of at least one tire in response to the condition and changing a contact patch from a first portion of the at least one tire from a first portion to a second portion. The first portion has different rolling characteristics from the first portion.

16 Claims, 4 Drawing Sheets

(56) References Cited

U.S. PATENT DOCUMENTS

| | | | |
|---|---|---|---|
| 2020/0331290 A1* | 10/2020 | Achcar | B60B 11/06 |
| 2022/0001712 A1* | 1/2022 | Broadbent | B62D 7/146 |
| 2023/0074160 A1* | 3/2023 | Geahchan | B60C 11/16 |
| 2023/0202239 A1* | 6/2023 | Tada | B60C 11/0306 |
| | | | 152/209.1 |
| 2023/0234397 A1* | 7/2023 | Dada | B60B 33/066 |
| | | | 16/19 |
| 2023/0234438 A1* | 7/2023 | Lee | B60G 3/20 |
| | | | 180/6.48 |
| 2023/0235674 A1* | 7/2023 | Kray | F02K 3/06 |
| | | | 60/226.1 |
| 2023/0286322 A1* | 9/2023 | Bolzoni | B60C 11/033 |
| 2024/0001728 A1* | 1/2024 | Ali | B60G 17/0165 |

FOREIGN PATENT DOCUMENTS

| | | | | |
|---|---|---|---|---|
| DE | 102016215778 A1 * | 3/2018 | | |
| DE | 102017204723 B4 * | 6/2021 | | B60G 15/06 |
| DE | 102022201618 A1 * | 8/2023 | | |
| EP | 2269843 A1 * | 1/2011 | | B60B 15/12 |
| JP | 2009-137471 A | 6/2009 | | |
| KR | 960000248 B1 * | 1/1996 | | |
| WO | WO-2022112468 A2 * | 6/2022 | | B60G 17/015 |

\* cited by examiner

METHOD AND SYSTEM FOR CONTROLLING A VEHICLE SUSPENSION FOR REDUCED ROLLING RESISTANCE

FIELD

The present disclosure relates to a method and system for controlling a suspension of a vehicle, and, more specifically, to a method and system for controlling camber of a vehicle to allow adjustments for using a tire construction that combines high rolling resistance and off-road portions.

BACKGROUND

This section provides background information related to the present disclosure which is not necessarily prior art.

Electrical vehicles are becoming increasingly popular. Various types of vehicles have been electrified. The electrification of vehicles has evolved from hybrid electric vehicles that were small in size to larger vehicles such as trucks and off-road vehicles. Off-road vehicles typically have off-road tires that have a high rolling resistance. Electric vehicles, on the other hand, typically have low rolling resistance tires to increase the range. The off-road tires typically have a look that corresponds to the aggressive look for an off-road vehicle.

Low rolling resistance tires do not have acceptable off-road performance. Off-road tires do not have low rolling resistance and aerodynamic performance.

SUMMARY

This section provides a general summary of the disclosure and is not a comprehensive disclosure of its full scope or all of its features.

The present disclosure relates generally to combining off-road characteristics and low rolling resistance into one tire for use with a control system for operating the same.

In one aspect of the disclosure, a method of operating a vehicle includes determining a condition of the vehicle, changing a camber of at least one tire in response to the condition and changing a contact patch from a first portion of the at least one tire from a first portion to a second portion. The first portion has different rolling characteristics from the first portion.

In yet another aspect of the disclosure, a system for operating a vehicle includes a vehicle condition device generating a vehicle condition signal. A controller determines a position based on the vehicle condition signal. A camber actuator is coupled to the controller changing a camber of at least one tire so that a contact patch changes from a first portion of a tread of the at least one tire from to a second portion based on the position. The first portion has different rolling characteristics than the second portion.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
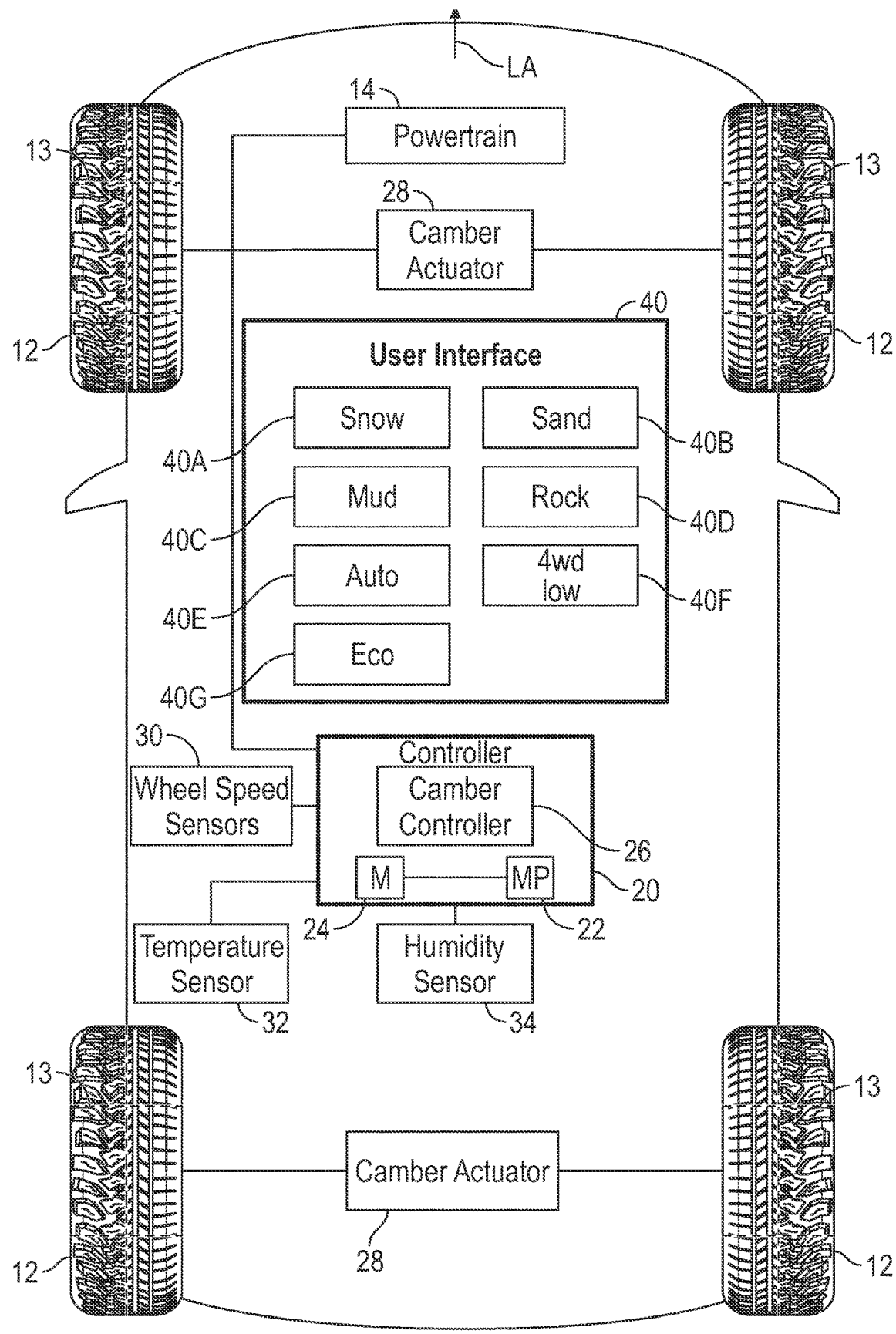
FIG. 1 is a block diagrammatic view of a vehicle with tires having two different characteristics.

Referring now to FIG. 1, a block diagrammatic view of a vehicle 10 is set forth. The vehicle 10 has a plurality of tires 12 mounted on wheels 13 (shown in hidden lines) that are powered by a powertrain 14 to move the vehicle 10 on a driving surface such as an on-road or off-road surfaces. The powertrain 14 may be an internal combustion engine, an electric powertrain having a battery and motors to drive the wheels and tires 12 or a combination thereof as a hybrid. When a battery or hybrid powertrain 14 are provided, the vehicle 10 may be referred to as an electric vehicle. The vehicle 10 has a longitudinal axis LA. The inside of the tires 12 is the side facing the longitudinal axis LA. The outside of the tires 12 face away from the longitudinal axis LA.

The vehicle 10 has a controller 20 with a microprocessor 22 and a memory 24 therein. The microprocessor 22 may also be referred to as a processor. The memory 24 stores various executable codes and intermediate results from the vehicle 10. The memory 24 is a computer-readable medium that includes instructions that are executable by the processor to perform various functions. In this example, the controller 20 has a camber controller 26 therein that is used to control the camber of the wheels 13 and therefore the tires 12 attached thereto through a camber actuator 28. That is, the camber controller 26 determines the camber based on one or more vehicle conditions and controls the camber actuator 28 to control the camber of the tires 12 relative to the surface on which the tires 12 are travelling. As illustrated in FIG. 1, two camber actuators 28 are illustrated. Each wheel 13 and tire 12 combination may include a camber actuator 28. The camber controller 26 uses various inputs corresponding vehicle conditions to determine the camber of the tire 12. The camber of the tire 12 refers to the angle of the tire relative to the vertical angle. The tire 12 may therefore be tilted or angled inward (the top of the tire 12 is moved toward the longitudinal axis LA) or outward (the top of the tire 12 is moved outward away from the longitudinal axis LA) relative to the vehicle 10. An example of camber is set forth below in FIGS. 3A-3B.

The camber controller 26 and the controller 20 are coupled to various sensors to obtain one or more vehicle conditions including wheel speed sensors 30, a temperature sensor 32 and a humidity sensor 34. The wheel speed sensors 30 generate individual wheel/tire speeds from which a vehicle speed signal that corresponds to the speed of the vehicle relative to the travelling surface may be determined through well-known methods. Likewise, the individual speed of one of the wheel and tire combinations may also be determined so that a stuck tire or tires can be determined.

The vehicle condition or conditions are determined by various devices such as sensors. The temperature sensor 32 determines the ambient temperature around the vehicle. The humidity sensor 34 determines the humidity of the ambient air around the vehicle.

The camber actuators 28 may be part of the suspension system or components added thereto and may be a motor activated arm or screw or the like for changing the camber of the tires 12.

The camber controller 26 controls the camber actuator 28 based upon a condition of the vehicle 10. The condition of the vehicle may be determined from the wheel sensors 30, the temperature sensor 32 and the humidity sensor 34. The controller 20 may automatically determine a desired camber for setting the camber actuator 28 as desired based upon the sensors. The camber controller 26 may also control the camber of the tires 12 based on another device such as a user interface 40. The user interface 40 may allow the user to select various setting such as the camber. In this example, the user interface 40 is made for an all-wheel drive vehicle that has various setting such as a snow setting 40A, a sand setting 40B, a mud setting 40C, a rock setting 40D, an automatic setting 40E, a four-wheel drive low setting 40F and an eco-setting 40G. Of course, various types of settings may be provided for different types of vehicles. These settings may include a predetermined amount of camber. For example, in four-wheel drive low, the camber may automatically be adjusted outward so that the off-road portion of the tire 12 forms the contact patch.

The user interface 40 generates control signals from each of the settings 40A-40G, the selected one of which is communicated to the controller 20. The controller 20 and the camber controller 26 therein controls the camber of the wheels 13 and tires 12 mounted thereto in response to the vehicle conditions. When the automatic signal is generated from the automatic selector 40E of the user interface 40, the controller 20 may automatically change the chamber of the tires 12 to load rolling resistance when the speed increases above a threshold such as 40 kph. Likewise, when any of the modes or vehicle conditions from the user interface 40A-40G rise above 40 kph, the vehicle may revert to the low rolling resistance side of the tires by changing the camber.

Figure 2A:
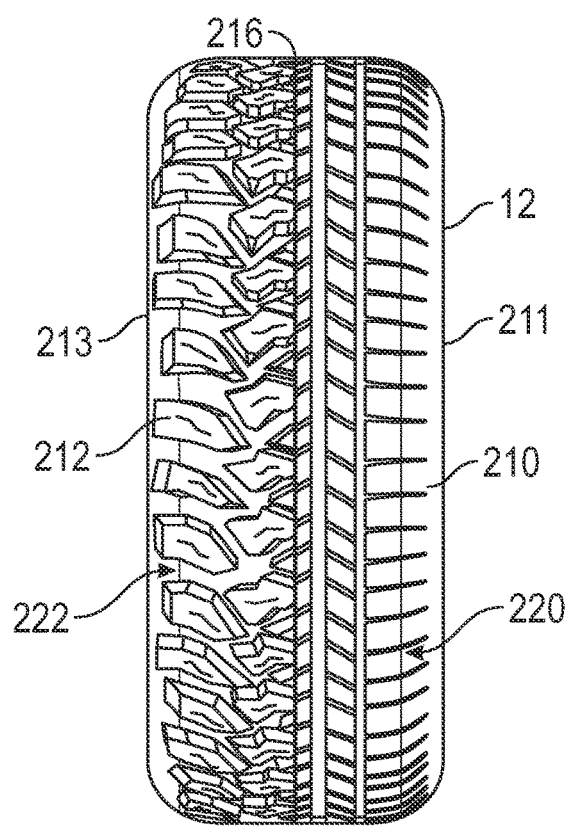
FIG. 2A is an end view of a tire having two different characteristics.
Figure 2B:
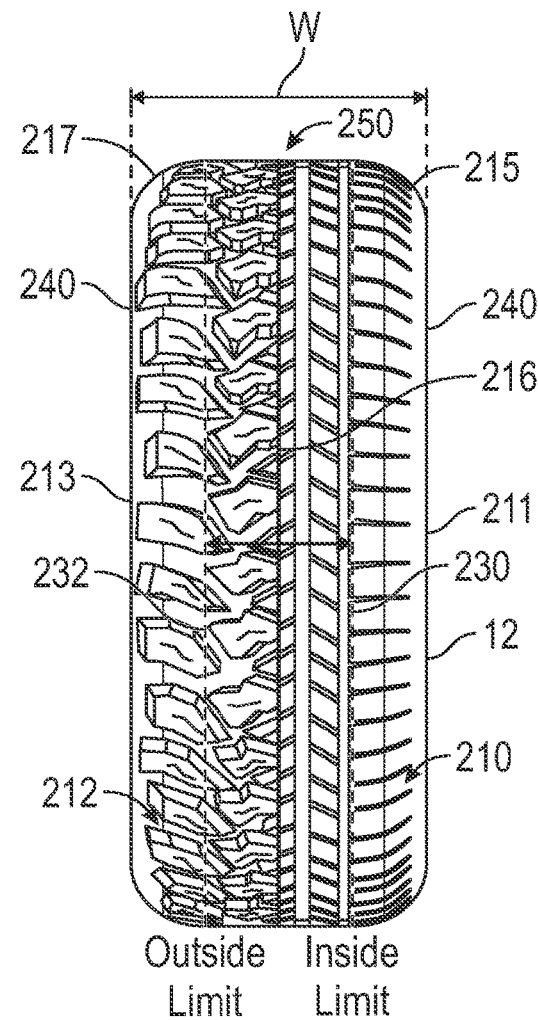
FIG. 2B is an end view of a tire having different characteristics with a boundary line that shows limits for the first portion and second portion of the tire.

Referring now to FIGS. 2A and 2B, an end profile of the tire is set forth. In FIG. 2A, an end view of a tire is illustrated. The tire 12 has a low rolling resistance portion 210 that is disposed on the inside surface 211 of the tire 12 relative to the vehicle 10. Low rolling resistance refers to the amount of force required to move the tire. Low rolling resistance means lower than that of the off-road portion. On the outside surface 213 of the tire 12, a second portion 212 has an off-road profile in characteristic. The off-road portion of the tire 12 has larger tread features and deeper grooves between the features and may include a different tire compound.

The inside surface 211 and the outside surface 213 form respective edges 215, 217 where they meet the circumferential tread 250, which is formed by the portions 20 and 212. The off-road portion 212 may have a high rolling resistance relative to the low rolling resistance of the first portion 210. A dividing line or boundary 216 is disposed between the first portion 210 and the second portion 212. By providing the second portion 212 on the outside surface 213 of the tire 12, the overall look of the vehicle 10 is maintained for an off-road type vehicle 10. The first portion 210 has a first tread block 220 that laterally extends from the inside surface 211 and is different from a second tread block 222 of the second portion 212 that laterally extends from the outside surface 213. The tread blocks and therefore the tread of the tire 12 is circumferential around the tire. The type of tread block may influence the amount of rolling resistance. The tread block 222 is a more aggressive off-road tread block and therefore has a different rolling characteristic such as a higher rolling resistance than the thread block 220. The rolling resistance may also be changed by various other factors including the stiffness of the sidewall 240 of the tire, the composition of the tread blocks 220, 222 and the underlayers within the tire 12 itself.

The boundary 216 may be changed depending upon the characteristics desired from the vehicle. The boundary 216 may be moved toward an inside limit 230 or toward an outside limit 232. That is, the tire 12 may be manufactured with the portions 210, 212 being greater or less than 50%. In one example, the inside limit is 25% of the width W of the tire 12. The boundary in FIG. 2B is at 50% of the width, meaning that 50% of the tread is low rolling resistance and 50% of the tread is for off-road purposes. When the boundary 216 is at the inside limit 230, 25% of the tire is low rolling resistance while 75% of the tire is off-road. When the boundary 216 is at the outside limit 232, 75% of the tire has a low rolling resistance thread, while 25% of the tire has an off-road profile. Therefore, the amount of either thread portion 210 or 212 can vary from between about 25% to 75% of the tread W.

Figure 3A:
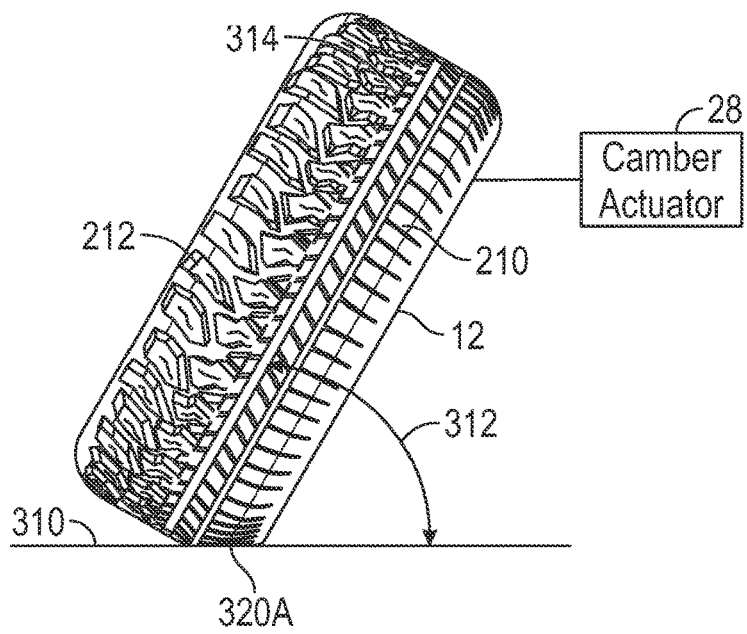
FIG. 3A is an end view of the tire having a camber so that the low rolling resistance portion of the tire contacts the driving surface.
Figure 3B:
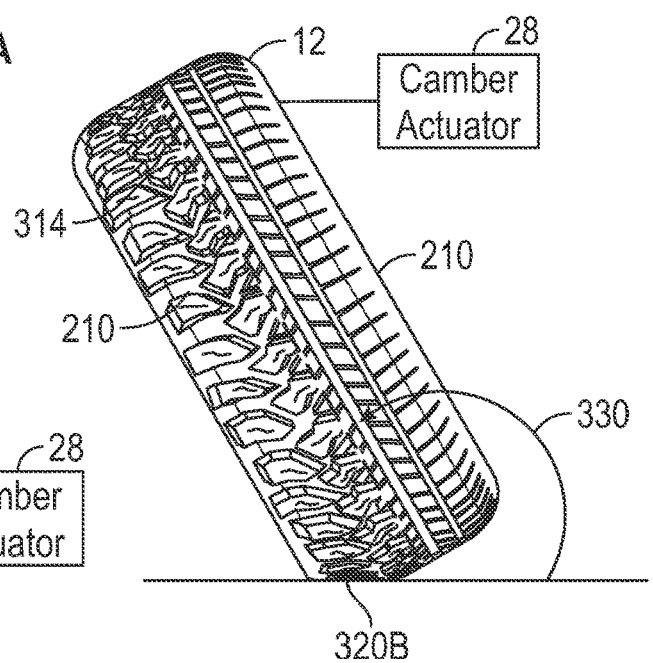
FIG. 3B is an end view of the tire having the camber actuator having an outward camber so that the off-road portion of the tire is in contact with the driving surface.
Figure 3C:
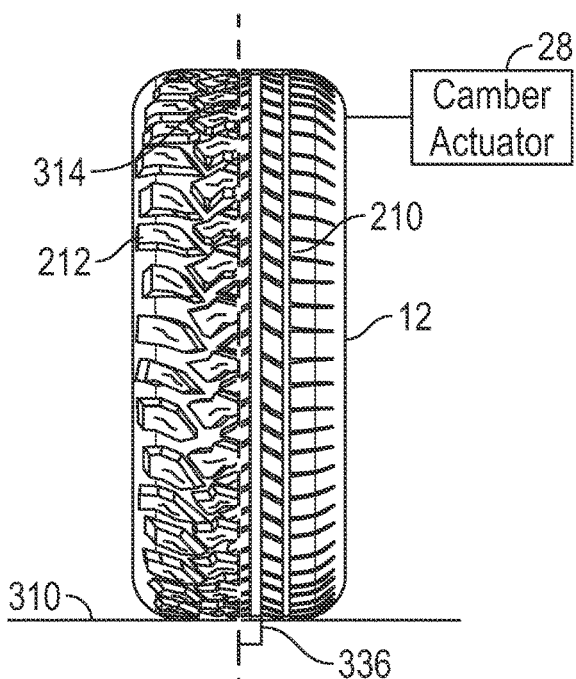
FIG. 3C is an end view of the tire having a neutral position in which both the low rolling resistance and off-road portions are in contact with the driving surface.

Referring now to FIGS. 3A-3C, the tire 12 is illustrated at various camber angles relative to a driving surface 310. In FIG. 3A, the camber actuator 28 has tilted tire 12 inward at an angle 312 relative to the typically vertical direction of the tire 12. The normal vertical axis of the tire 12 is illustrated at 314. The camber actuator 28 may be used to adjust the angle 312 to the desired position so that a contact patch 320A with the vehicle 10 corresponds to the desired portion. In this example, the contact patch 320A is formed by the off-road or second portion 212 of the tire 12.

In FIG. 3B, the camber actuator 28 tilts the top of the wheel 13 and therefore the tire 12 outward to form the angle 330 with the driving surface 310. In FIG. 3B, the first portion 210 corresponding to the low rolling resistance portion of the tire 12 forms the contact patch 320B.

Referring now to FIG. 3C, the camber actuator 28 may maintain the tire in a vertical direction illustrated by the angle 336.

Figure 4:
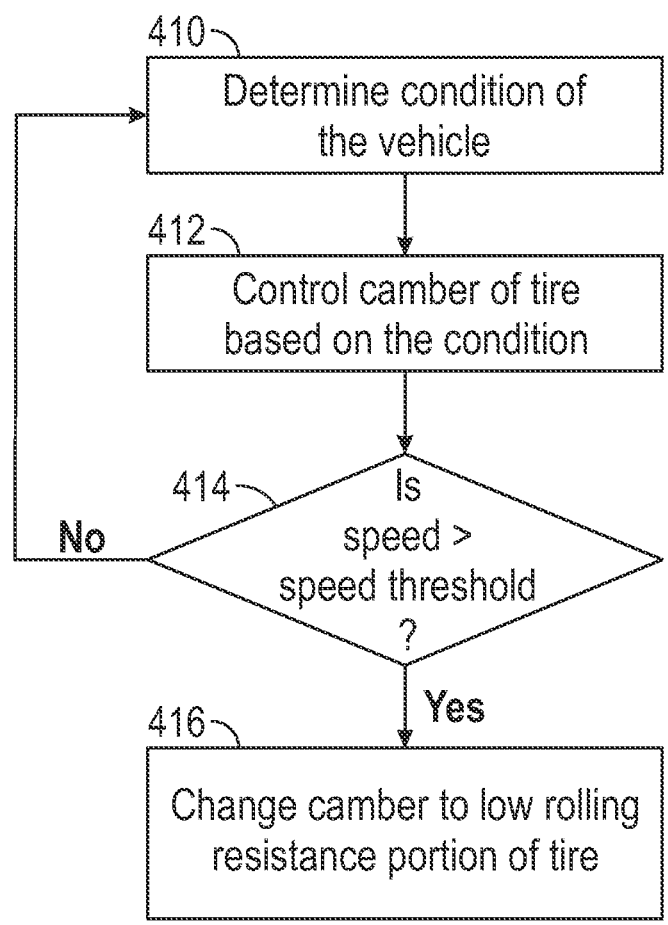
FIG. 4 is a flowchart of a method for operating the vehicle.

Referring now to FIG. 4, a method for controlling the vehicle is set forth. In step 410, the vehicle condition for the vehicle is determined from one of the devices such as the sensors or the user interface. The condition of the vehicle, as mentioned above, may be determined in various ways including automatically through a sensor or through the use of the user interface or combinations thereof. That is, the condition of the vehicle may be selected at the user interface 40 or from the sensors 30-34. In step 412, the camber of the tire is controlled. That is the camber controller of the controller calculates the amount of camber to be applied to the tires in response to the condition (sensors or user interface) of the vehicle.

Some automatic control may also be performed especially above a predetermined speed. In step 414, when the speed is greater than a speed threshold, the camber may be changed. In step 416 to apply the low rolling resistance portion of the tire to the contact patch the camber is changed. That is, the camber may be changed by operating the camber actuator 28 to move the tire so that the low rolling resistance portion of the tire is against the driving surface 310.

Referring back to step 414, when the speed is not greater than a speed threshold, the condition of the vehicle is continually determined in step 410 so that the camber may be continually changed.

The flowchart in FIG. 4 may also be used for one or more tires less than all of the tires. That is, should one tire become stuck as sensed by the sensors, the camber of one of the tires may be changed to advantageously allow the vehicle to move or become unstuck.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of operating a vehicle having at least four tires comprising:
   generating a selection signal at a user interface, said selection signal corresponding to one of a plurality of conditions, each condition of the plurality of conditions corresponding to a different camber;
   changing the camber of the at least four tires in response to the the selection signal; and
   changing a contact patch from a first portion of the at least four tires to a second portion, said second portion having different rolling characteristics from the first portion.

2. The method of claim 1 further comprising determining a wheel speed.

3. The method of claim 2 wherein when the wheel speed is greater than a threshold, changing the camber corresponding to the selection signal to another camber so a low rolling resistance portion contacts a driving surface.

4. The method of claim 1 wherein generating the selection signal comprises generating the selection signal corresponding to one of the plurality of conditions comprising a mud setting, a snow setting, a sand setting and a rock setting.

5. The method of claim 4 wherein the plurality of conditions further comprises determining a four wheel drive setting.

6. The method of claim 4 wherein the plurality of conditions further comprises determining a four wheel drive low setting.

7. The method of claim 4 wherein the plurality of conditions further comprises determining an ambient temperature and an ambient humidity.

8. The method of claim 1 wherein changing the camber of the at least four tires in response to the condition comprises controlling camber actuators to change the camber of four tires.

9. A system for operating a vehicle having at least four tires comprising:

a user interface comprising a plurality of selectable condition settings, said user interface generating a selection signal corresponding to one of the plurality of selectable condition settings, each selectable condition of the plurality of selectable condition settings corresponding to a different camber;

a controller determining a camber based on the selection signal; and a camber actuator coupled to the controller changing the camber of the at least four tires so that a contact patch changes from a first portion of a tread to a second portion based on the camber, said first portion having different rolling characteristics than the second portion.

10. The system of claim 9 further comprising a wheel speed signal corresponding to a vehicle speed.

11. The system of claim 10 wherein the controller, when the vehicle speed is greater than a threshold, controls the camber actuator to change the camber of the tires so a low rolling resistance portion contacts a driving surface.

12. The system of claim 9 wherein the user interface comprises the plurality of selectable condition settings comprising a mud setting, a snow setting, a sand setting and a rock setting.

13. The system of claim 12 wherein the selection signal comprises a four wheel drive setting as one of the plurality of selectable condition settings.

14. The system of claim 12 wherein the selection signal comprises a four wheel drive low setting as one of the plurality of selectable condition settings.

15. The system of claim 9 wherein the controller determines the camber based on an ambient temperature signal and an ambient humidity signal.

16. The system of claim 9 wherein the camber actuator comprises a plurality of camber actuators, said controller controlling the plurality of camber actuators to change the camber of four tires.

* * * * *